United States Patent [19]

Menasian

[11] Patent Number: 4,565,555
[45] Date of Patent: * Jan. 21, 1986

[54] VACUUM COLLECTOR

[76] Inventor: David R. Menasian, 12140 Powerhouse Rd., Potter Valley, Calif. 95469

[*] Notice: The portion of the term of this patent subsequent to Dec. 10, 2002 has been disclaimed.

[21] Appl. No.: 428,513

[22] Filed: Sep. 29, 1982

[51] Int. Cl.⁴ ............................................. B01D 46/00
[52] U.S. Cl. ........................................ 55/288; 55/300; 55/502
[58] Field of Search ................. 55/283, 286, 287, 288, 55/300, 304, 305, 357, 429, 295–297

[56] References Cited

U.S. PATENT DOCUMENTS

| | | | |
|---|---|---|---|
| 251,121 | 12/1881 | Kirk | 55/285 |
| 704,724 | 7/1905 | Whitney | 55/286 |
| 1,109,997 | 9/1914 | Lob | 55/287 |
| 2,318,395 | 5/1943 | Hornbrook | 55/287 |
| 3,898,414 | 8/1975 | Hawley | 55/283 |
| 4,199,334 | 4/1980 | Berkhoel | 55/304 |
| 4,246,011 | 1/1981 | Oberdoerfer | 55/283 |

Primary Examiner—Bernard Nozick
Attorney, Agent, or Firm—John L. Hummer

[57] ABSTRACT

A unique hybrid shop-style and continuous-duty vacuum collector using a large diameter filter has the advantages and capabilities of both specialized types. Because of efficient design and the use of pleated paper, the effective filter surface area is many times that of a conventional shop vacuum. This enables extended runs between filter cleanings in a reliable portable machine intended for both the hobbyist and the commercial shop operator. The filter cleaning mechanism breaks away the dirt accumulated on the filter surfaces by means of a plurality of shock generators symmetrically located at the filter circumference. These peripherally-generated shocks and the resulting filter oscillations are efficiently distributed by the design to be exactly parallel to the pleated paper surfaces, in order to protect the filter from damage. A mechanical sail interlock prevents further damage by precluding accidental activation of the filter cleaning mechanism during the dirt collection process. The invention also has special purpose applicability as a filtering element in gaseous systems, including those of low-gravity space.

16 Claims, 5 Drawing Figures

VACUUM COLLECTOR

BACKGROUND OF THE INVENTION

1. Field of the Invention

This invention relates generally to the vacuum collector arts and applies to a hybrid-capability machine that can effectively satisfy the requirements posed by both of two dissimilar basic types: the continuous-duty dust collector and the high-suction portable collector which is conventionally called a shop vacuum.

2. Prior Art

Co-pending Application Ser. No. 382,447 filed May 26, 1982 is incorporated by reference. The general principles described in the sections entitled "Basic Principles of Pleated-Paper Filter Cleaning", "Notes on Terms", "Cleaning Oscillations", and "Special Purpose Applications" are particularly significant with respect to this application. Therein will be found a discussion of this inventor's hybrid solution to eliminate the underlying size, portability and functional incompatibilities of the two dissimilar types of collectors. In summary, these incompatibilities were resolved by unique design and by means of (1) tripling the "conventional" shop vacuum filter surface area, (2) the use of pleated-paper filters to further multiply the effective filtering area by as much as 10 or so, and (3) the inclusion of a unique filter-cleaning mechanism which relies on a controlled shock action applied very carefully to oscillate the pleated-paper surfaces only in their planes to completely avoid damage to the filter paper yet efficiently clean the filter surfaces while protecting the operator and the environment. In addition, positive interlocks prevent inadvertent filter damage by immobilizing the filter cleaning function during normal vacuum collector operation.

SUMMARY OF THE INVENTION

In co-pending Application Ser. No. 382,447, a single cylindrical filter arrangement was presented in FIG. 5. The present application represents this applicant's further invention of improved arrangements when a single very large diameter filter is used. For the reasons explained in the co-pending application, it is desirable to make the diameter be as large as possible to maximize the filter area.

While other filter shapes than cylindrical, such as elliptical, star or square could be used, and are encompassed by this invention, they are less desirable for a portable machine. Since a cylindrical housing mated to a cylindrical drum is a highly practical combination for dust and particulate disposal, and since blowers are naturally cylindrical, the designer is led naturally to a cylindrical filter efficiently fitted into the annular space between the machine housing or drum and the blower. If a special purpose application demands a non-cylindrical or oddly shaped housing, the filter can be similarly shaped to maximize the filter area, with properly shaped retaining mounts holding the filter element instead of the retaining rings used in the present disclosure's drawings.

When extraordinarily large cylindrical filter diameters are employed, the structure required to radially distribute a centrally-generated shock to the filter paper at the periphery becomes expensive. In addition, the desire to utilize an extremely high capacity blower results naturally in a central location for the large blower and its drive motor, rather than the off-center location shown in the drawings of the co-pending application. For these reasons the shock generator should be moved to the periphery.

Thus the present application discloses the applicant's further inventions encompassing (1) peripherally applied filter-cleaning shocks generated by means of (2) a plurality of peripherally-located impact generators of the type already described in the co-pending application. The resulting arrangements are very efficiently packaged yet are based upon the previously disclosed and proven basic filter cleaning principles. It is understood throughout this disclosure that equivalent elements and equivalent methods of attachment exist.

THE PREFERRED EMBODIMENT

Figure 1:
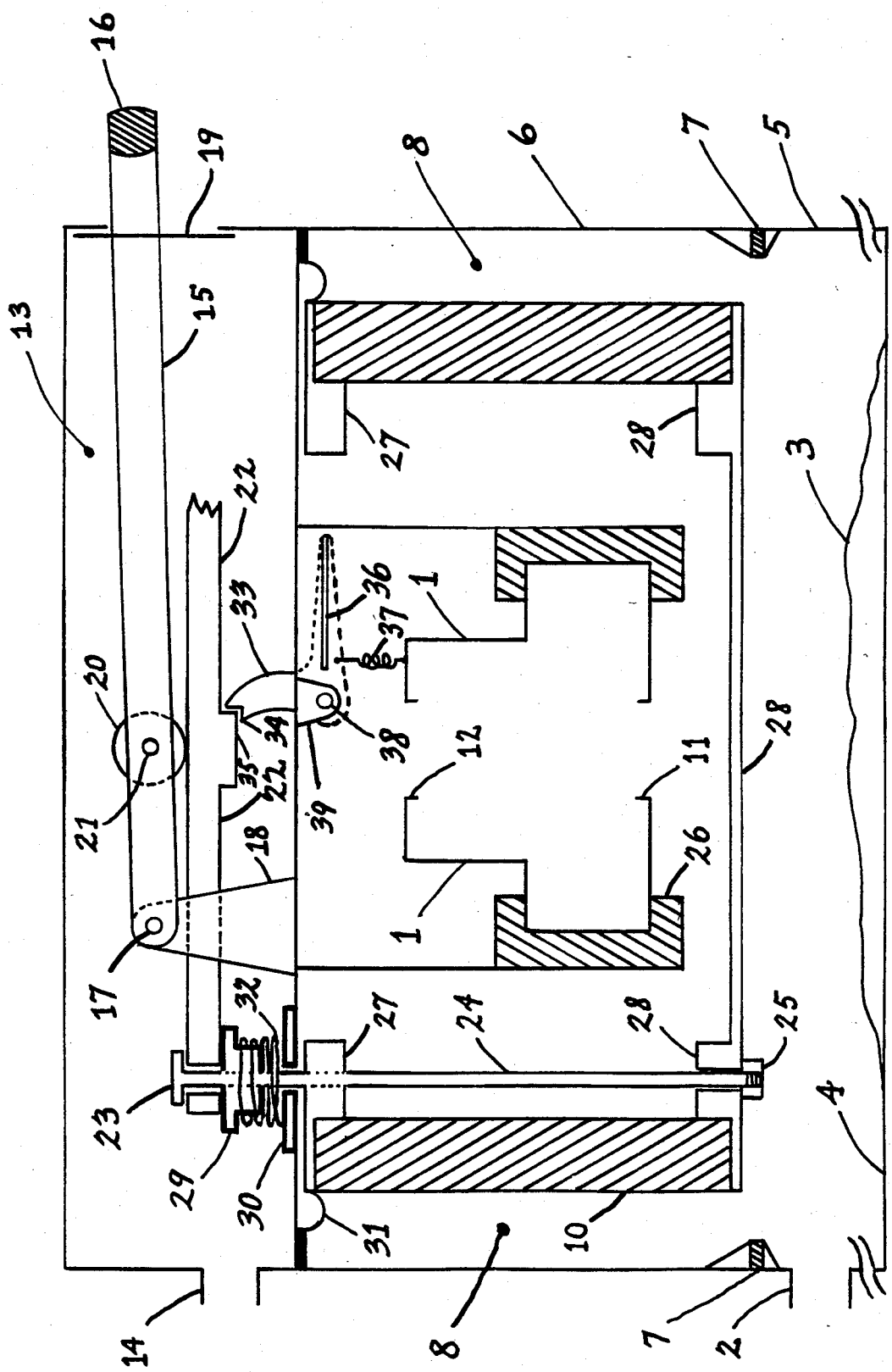
FIG. 1 is a somewhat schematic depiction of the preferred embodiment of the present invention as seen from the side showing the manual filter cleaning lever 15 and an edge view of the mechanical sail 36, which is carried on the interlock 33 that is hinged on pin 38 held by fixed brackets 39 in the output air stream of blower 1 to pivot and disable the cleaning of filter 10 when suction is present.
Figure 2:
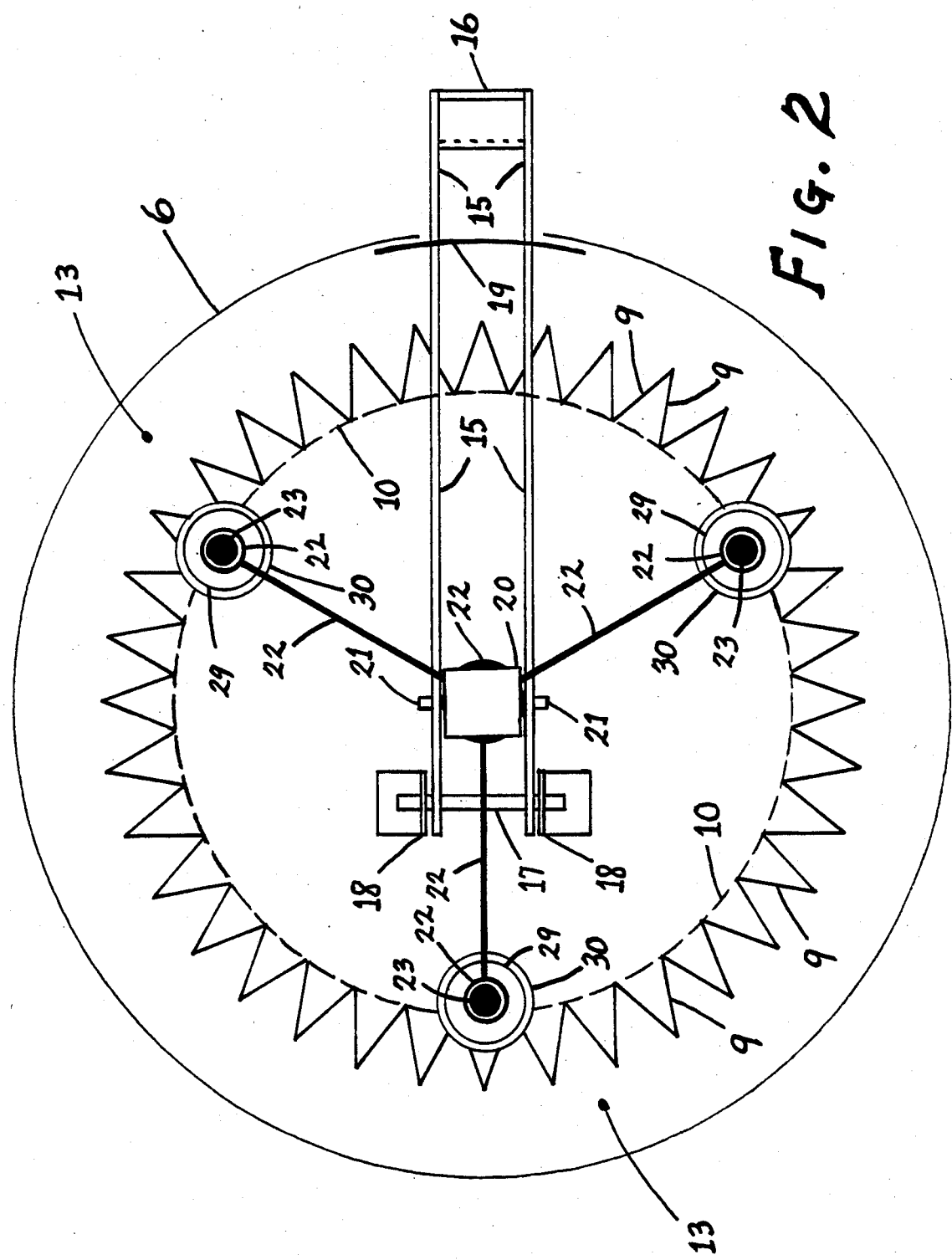
FIG. 2 presents a similar top view of the manual cleaning lever, which transmits force to the spider 22 by means of a roller 20.
Figure 3:
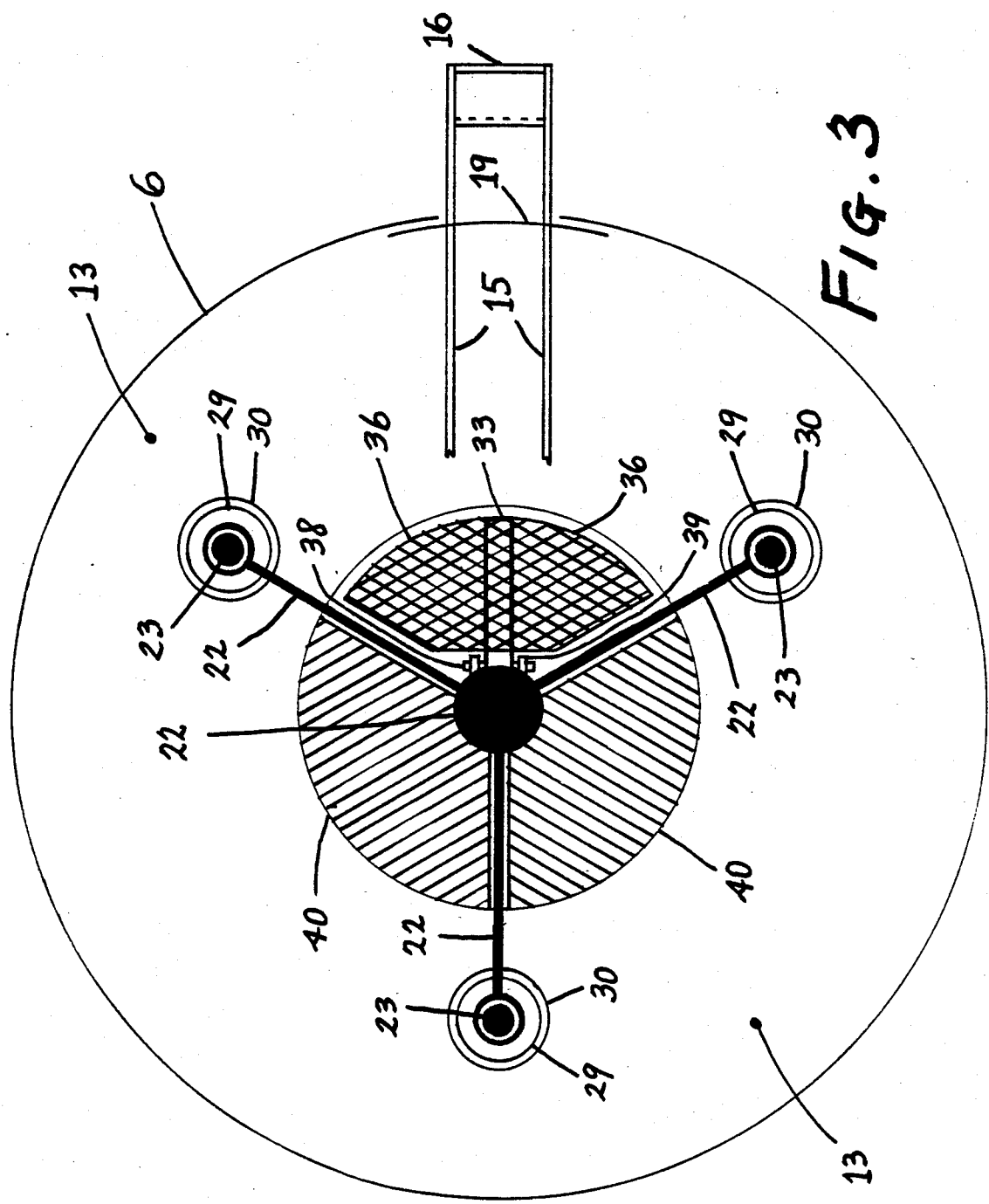
FIG. 3 is a schematic cutaway top view illustrating baffle plates 40 (shown slant shaded) which direct the blower air discharge toward the mechanical sail 36 (shown crosshatched).

FIGS. 1, 2 and 3 should be examined together to gain an understanding of the invention as depicted in the preferred embodiment. FIG. 2 is a side view while FIGS. 2 and 3 and top views in which different subassemblies are separately emphasized: FIG. 2 concentrates on the manual cleaning lever actuator, while FIG. 3 focusses on the automatic interlock mechanism. The drawings are schematic; simple lines are frequently used to denote what must obviously be a strong structure; and exaggerated clearances may be used for clarity.

GENERAL OPERATION OF THE PREFERRED EMBODIMENT

In response to the strong vacuum of the large centrally-located electric motor-driven two-stage centrifugal blower 1, debris and dust-laden air enter the intake tube 2.

Heavy particles fall to the pile 3 on the bottom 4 of the collector drum 5. The drum is depicted shortened in depth to save drawing space, but it should be very deep to allow a large quantity of dust and debris to fill the drum before it becomes necessary to detach the drum from the vacuum system housing 6 at the annular seal 7 and remove the accumulation.

Airborne dust which will not settle out by gravity is carried by the moving air in the sealed chamber 8, which constitutes the unfiltered air region, until it is stopped by the pleated-paper surfaces 9 of the large diameter single cylindrical filter 10. The air stream from the intake tube should be directed such that it does not strike the pleated paper surfaces directly. Clean air passes through the filter paper pores and into the blower inlet port 11, and thence out of the blower outlet port 12 into the muffler chamber 13, which constitutes the clean air region. The clean air exits the machine through the exhaust tube 14.

CLEANING OPERATION OF THE PREFERRED EMBODIMENT

The cleaning process takes place within the sealed chamber 8 where the dirt accumulates. Dislodged dust falls to the bottom of the drum without exposing the operator or the environment.

A dual lever 15 spanning an externally accessible cleaning handle 16 is hinged by a pin 17 to two fixed brackets 18 mounted within the muffler chamber 13. A sealing slip joint 19 allows lever motion when the blower is not running while preventing air escape from the muffler chamber while the blower is running. The dual lever also spans a lever roller 20 carried by a pin 21. When the cleaning handle is smartly depressed, the lever roller transmits the vertical component of the motion to a symmetrical three-legged spider 22, which is loosely constrained by three heads 23 on three symmetrically-positioned shafts 24. The horizontal component of the motion is not transmitted since the lever roller rests on a flat horizontal area of the spider. Thus the legs of the spider transmit the vertical motion to the three shafts. For convenience, only one of the shafts is shown in the side view of FIG. 1, but the three shafts are 120 degrees apart around the inner periphery of the filter 10. The shafts are firmly attached to the upper filter mounting ring 27. The lower filter mounting ring and sealing plate 28 is readily removed to allow filter and blower servicing by taking off three nuts 25.

The downward motion of the shafts, which is everywhere exactly parallel to all filter surfaces, continues until three stop collars 29, which are firmly attached to the shafts, sharply impact on three stop plates 30 mounted within the muffler chamber 13. The muffler chamber housing must be sturdily constructed to enable step function generation of filter cleaning oscillations on impact of the stop collars on the stop plates. These oscillations are everywhere exactly parallel to the pleated paper surfaces. Experimentation will be necessary to select the appropriate diameter for the length of longitudinally springable impact shaft between the stop collar and the effective oscillatory filter assembly mass such that the effective spring constant optimizes oscillation and frequency for the dusts and particulates to be encountered. Thus the peripherially-generated shocks and oscillations are efficiently distributed everywhere exactly parallel to the filter surfaces by the assembly of shafts, the upper mounting ring, and the lower mounting ring and sealing plate to the filter pleats, causing dirt to be dislodged. Throughout the process, an annular flexible diaphragm seal 31 and the lower mounting ring and sealing plate 28 preserve an airtight barrier between the unfiltered and filtered air regions. Three springs 32 return the entire linkage to its upper rest position when the manual force on the cleaning handle is removed. Although three shafts symmetrically located enable efficient distribution of the shock to a large diameter filter structure, more than three with associated stop collars, stop plates and return springs can be used if an extraordinarily large diameter or oddly shaped bulky filter is used.

In a low or artificial gravity application, the vacuum collector must be oriented to have the direction of the force of gravity be parallel to the planes of the filter paper pleats.

MECHANICAL INTERLOCK OF THE PREFERRED EMBODIMENT

If filter cleaning were attempted during normal operation of the blower, dust would cling to the filter and could be driven deeper into the paper pores. To prevent this, a mechanical sail switch interlock 33 carries a notch 34 which can engage a shoulder 35 attached to the spider 22. Thus the downward motion is locked out when the attached sail 36 is pivoted upward on the hinge pin 38, against the force of the return spring 37, by the force of the air passing from the blower outlet 12 into the muffler chamber 13. The hinge pin is held by a pair of fixed brackets 39. The interlock is effective until the air velocity from the blower drops to a minimal value that cannot damage the filter paper even after the blower has been shut off and is coasting to a stop. Only then will the return spring retract the sail switch interlock and allow the cleaning function to be accomplished.

MISCELLANEOUS FEATURES OF THE PREFERRED EMBODIMENT

Two baffle plates 40 direct the blower discharge toward the sail switch. Sufficient clearance must be provided between the sail and its surrounding air passage to allow air flow with only the minimal restriction required to operate the interlock.

While a strong centrally-located single return spring could have been used to return the filter assembly, spider and lever to the upper rest position, the use of three peripherally-located return springs aids in keeping the diaphragm 31 aligned.

The muffler chamber can be appropriately ribbed to provide a labyrinth of sound deadening passages as well as rigid support for the attached parts. The blower can be carried by a vibration and sound reducing mounting 26.

CLEANING ON UP STROKE VERSUS CLEANING ON DOWN STROKE

This inventor has found that cleaning by the shock method occurs satisfactorily when the impact stroke is either in the direction of or opposite to the force of gravity. Therefore, the basic principles of pleated-paper filter cleaning can be utilized in either of two unidirectional ways, or in a combined bi-directional fashion. Therefore, in FIG. 1, if the cleaning lever is pulled upwards, or even simply released, at the end of the down stroke, some minor cleaning occurs when the upper retaining ring 27 acts as a stop collar and impacts the lower face of the stop plate 30 as the return springs 32 go to their upper rest position. This function is more fully utilized in the next version to be described of the single cylindrical filter vacuum collector in which electrical solenoids are employed as the cleaning actuator.

SOLENOID CLEANING ACTUATOR EMBODIMENT

Figure 4:
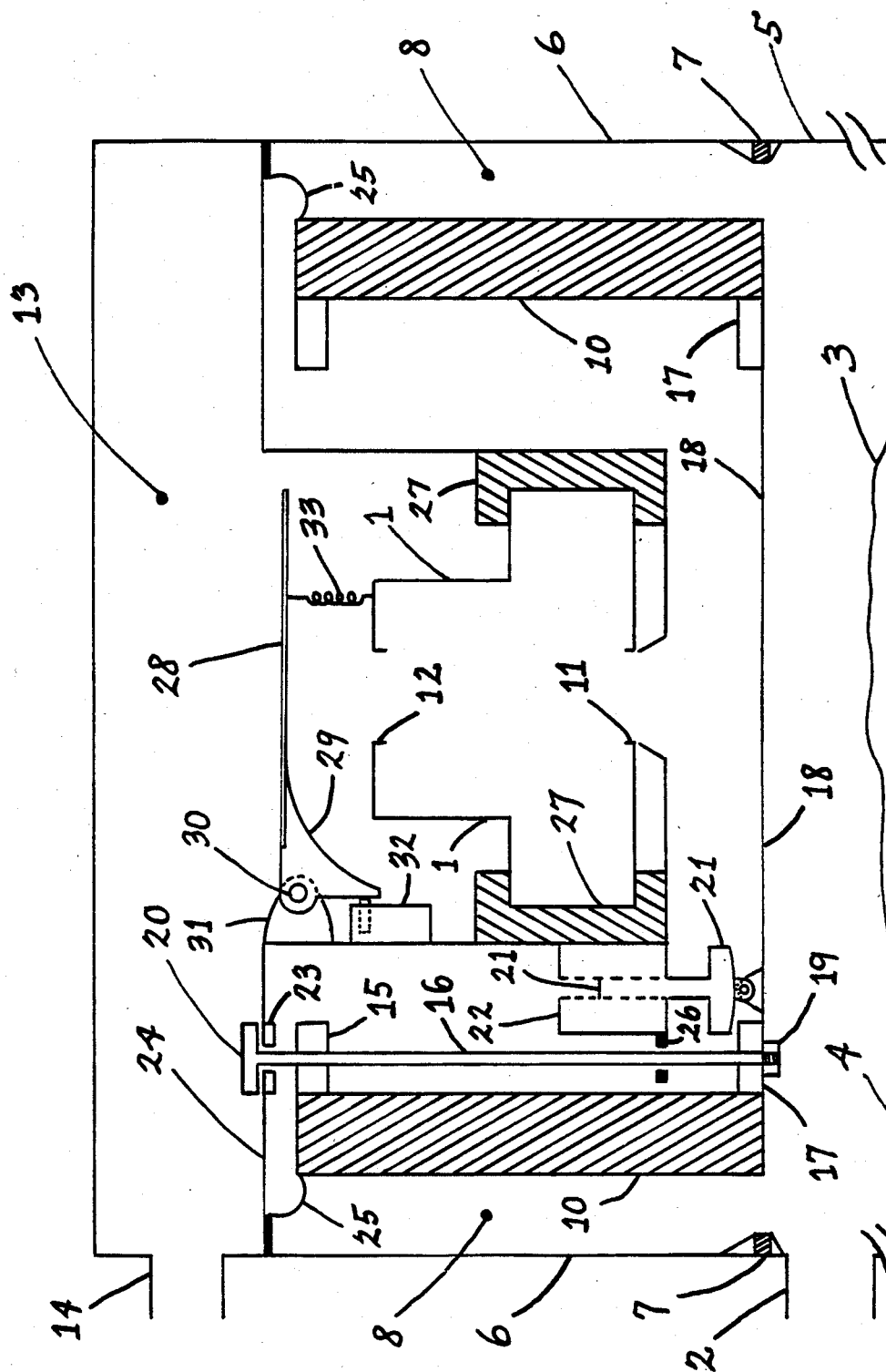
FIG. 4 is a schematic side view of another embodiment of the present invention that employs three electrical solenoids 22 (only one is shown) with three accompanying armatures 21 (again, only one is shown) as filter cleaning actuators.
Figure 5:
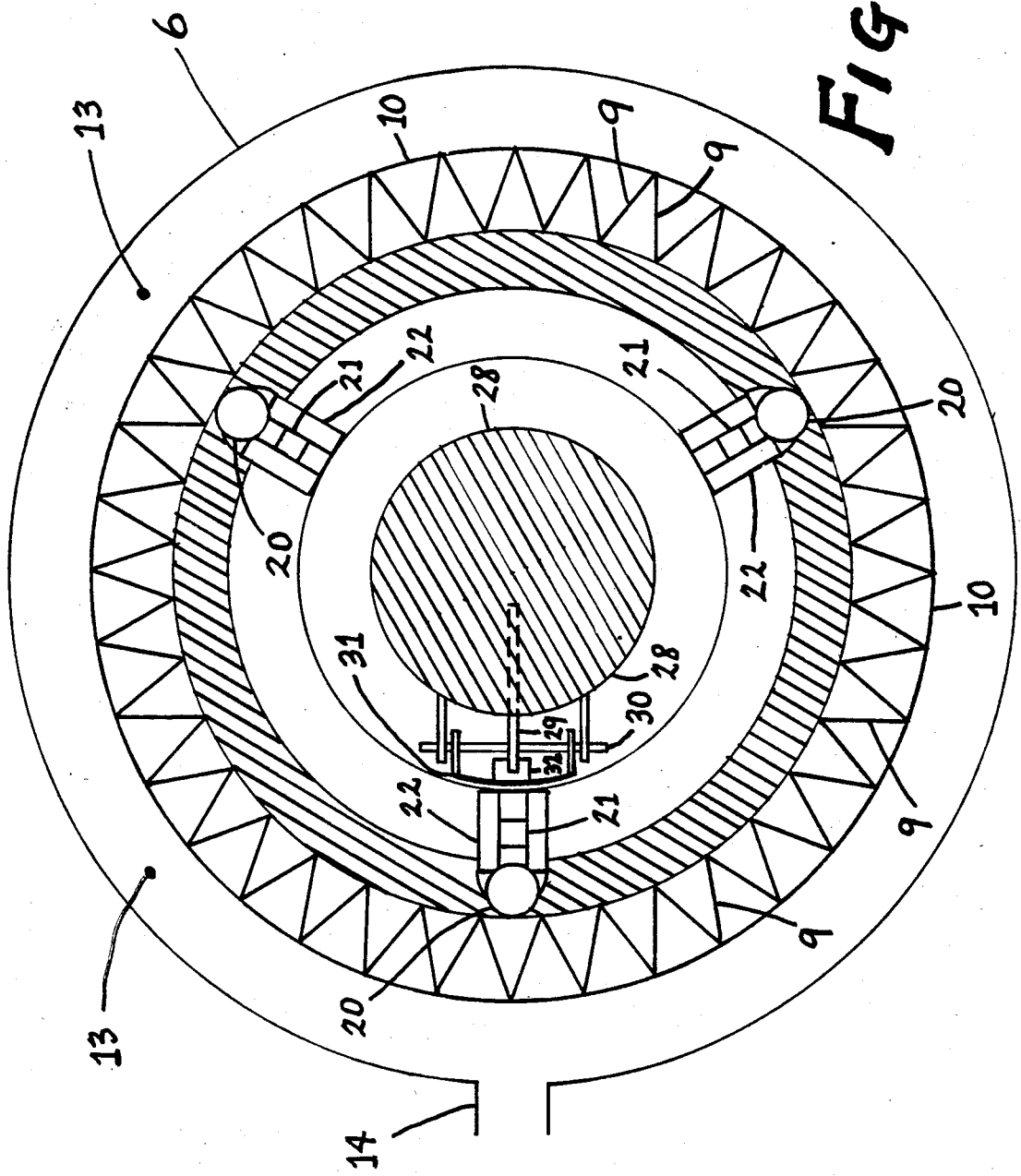
FIG. 5 is a top view of the FIG. 4 mechanism featuring a mechanical sail 28 controlling a microswitch 32 to inhibit filter cleaning when an air stream from blower 1 is present.

FIG. 4, a side view, and FIG. 5, a top view, should be examined together. The drawings are schematic, clearances are sometimes exaggerated, and not all parts are shown in both drawings.

GENERAL OPERATION

Since the parts numbered 1 through 14 in FIGS. 4 and 5 are identical to those similarly numbered in FIGS. 1, 2 and 3 depicting the preferred embodiment, the previous section "General Operation of the Preferred Embodiment" is also applicable here.

FILTER ASSEMBLY

The filter assembly of the solenoid cleaning actuator embodiment consists of the following: the upper mounting ring 15 which is firmly attached to the three vertical shafts 16 that are symmetrically located around the inner periphery of the filter assembly, the pleated-paper filter 10, the lower mounting ring 17 and sealing plate 18 which are detachable for servicing by removing three nuts 19 from the lower ends of the shafts, and three stop collars 20 which provide a lower rest position during normal vacuum collector operation.

CLEANING OPERATION

Externally activated by an electrical connection, the cleaning takes place within the sealed chamber 8 where the debris accumulates, and without exposing the operator or the environment.

The filter assembly is free to travel upward rapidly as propelled by the plungers 21 of three solenoids 22 symmetrically mounted around the sealing plate 18, which together with the flexible diaphragm seal 25 preserves an airtight seal between the unfiltered and filtered air regions.

The upward momentum of the filter assembly and the solenoid plungers creates a strong shock when the three impact faces of the upper mounting ring 15, which performs the stop collar function, impact with the lower surfaces of the three stop plates 23. The stop plates are stoutly mounted on the strong annular interior wall 24 of the muffler chamber. The shock is transmitted through the filter assembly causing dust and dirt to be dislodged. Experimentation will be necessary to select the proper masses and springable flexibilities of the various parts constituting the filter assembly in order to achieve vibration of the pleated filter paper in the planes of the pleats.

When the solenoids are de-energized, the filter assembly falls to its lower rest position by gravity, and further minor cleaning impacts can occur between the upper stop collars 20 and the upper impact surfaces of the stop plates 23.

MISCELLANEOUS FEATURES

Three guided bushings 26 and the three stop plates 23 constrain the cleaning movement of the filter assembly.

The muffler chamber can be appropriately ribbed to provide a sound deadening labyrinth and a rigid support for the stop plates and the motor vibration-reducing mount 27.

INTERLOCK OPERATION

A combined mechanical/electrical interlock consists of a sail 28 attached to a lever 29 pivoted on a pin 30 held by a bracket 31. Whenever there is a significant flow of air, the lever motion opens the microswitch 32 and prevents energization of the cleaning solenoids. The return spring 33 assures positive switch closure.

CONCLUDING NOTE

It will be recognized that the foregoing design involving the rest position of the filter assembly at the bottom of the cleaning stroke, can also be used with a manual lever cleaning actuator. The spider must now lift the filter assembly, which can be readily accomplished by locating the bracket 18 in FIG. 1 between the roller 20 and the handle 16, with the roller now underneath the spider 22. This will achieve an upwards cleaning action by a downstroke on the handle 16, which is the easiest motion for the operator. Cleaning by an upstroke on the handle is to be avoided.

I claim:

1. A high-suction portable, hybrid shop-style and continuous-duty vacuum collector, whose arrangement also has special purpose applicability, with improved capability and effectiveness in extending the running time between filter cleanings while filtering a wide range of sizes and weights of mixed dust and particulate debris from gases such as air and incorporating a compact, efficient and simple filter-cleaning mechanism that protects the operator and the environment from exposure to dust during cleaning but cannot accidentally be activated during the dirt collection process, comprising:

a detachable rigid air-tight dust-accumulating enclosure, open on top, into which the incoming particulate-laden gas flows from an inlet on entering in a direction to avoid striking any filter surfaces directly, and which collects the heavier particles by gravity on the bottom of said dust enclosure; and filter assembly means for producing a very large total filter surface area by mounting as an integral assembly, at least one gas-penetrable and dust-impervious hollow pleated filter, in which the normal directions to all of the filter surfaces are placed in a plane and are thus confined to two dimensions of three-dimensional space, and with this filter surface orientation no filter surface faces or has its normal in the third dimension, in order to collect the lighter particles and dust on the outside of said oriented filter surfaces, and carried on a housing completely covering said open top of said dust enclosure so as to constitute a closed dust chamber containing said filter assembly, and which communicates with the clean gas region of said housing only through said filter; and filter cleaning means, further comprising:

filter moving means for constrained motion of said integral filter assembly as a unit only in said third dimension, and operated from outside said housing without having to disconnect any connections or subject said filter surfaces to any deformation; and filter shock means for subjecting said integral filter assembly as a unit to a sharp impact shock in said third dimension by abruptly arresting said motion in order to dislodge said particles and dust adhering to the outside of said filter surfaces, enabling them to fall by gravity to said bottom of said dust enclosure; and flexible filter connection means connecting said covering housing to said filter assembly for maintaining the integrity of the internal gas passages from said filter assembly to the clean gas region of said housing while said motion and said shock are being applied, so that none of said particles and dust either enter said clean gas region or are dispersed to the external environment; and suction means with in the filter hollow for applying blower suction to the clean gas inside of said integral filter assembly; and an outlet from said housing for discharging into the surrounding atmosphere the filtered air from said suction means; and interlock means for rendering said filter cleaning means inoperable when said suction means is operating.

2. A vacuum collector according to claim 1 wherein said filter moving means comprises:

at least three strong parallel shafts slidably mounted on said housing and constrained to have longitudinal motion in said third dimension and firmly attached to said integral filter assembly near to the filter assembly periphery to form a moving assembly such that the filter surfaces move only in their surface planes and not normal to the surfaces; and actuating means for sliding said moving assembly to enable operation of the filter cleaning mechanism from a location external to the vacuum collector; and wherein said filter shock means comprises:

a plurality of strong metal stop plates fastened to said housing and with impact faces perpendicular to said shaft direction; and a plurality of strong metallic surfaces which constitute impact faces securely carried on said moving assembly and oriented to be parallel to, and capable of delivering sharp blows to, the impact faces of said stop plates while arresting the motion of said moving assembly, and such that the motion of said actuating means is transmitted to said filter assembly until the impact faces of said moving assembly and said stop plates generate sharp arresting shocks which are transmitted to said filter assembly so as to knock off the dust accumulation by means of forces everywhere parallel to the filter surfaces but not normal to the filter surfaces so as not to deform said filter surfaces; and wherein said flexible filter connection means comprises:

at least one flexible seal between the suction end of said filter assembly and said covering housing.

3. A vacuum collector according to claim 2 wherein said third dimension for constraint of said longitudinal motion of said shafts is the local gravity direction, which is the vertical for the case of a stationary vacuum collector on the surface of the earth, and is the spoke direction for the case of a rotating wheel artificial gravity station in space.

4. A vacuum collector according to claim 3 wherein some of said strong metallic surfaces which constitute impact faces are carried on stop collars attached to said shafts.

5. A vacuum collector according to claim 4 wherein said filter shock means further comprises a stiffly springable length of said shaft that separates each of said shaft-attached stop collars from said filter assembly so that said sharp arresting shock caused by the impact face of each of said shaft-attached stop collars striking the mating impact face of the corresponding stop plate is transmitted through said stiffly springable length to the mass of said filter assembly to generate a mechanical oscillation in said third dimension to facilitate the cleaning of the filter surfaces.

6. A vacuum collector according to claim 5 wherein said interlock means comprises:

a hinged sail springably placed in the path of the gas stream being delivered into a muffler chamber within said housing by said suction means, and wherein said muffler chamber has an outlet for the exiting clean gas; and locking means for preventing said actuating means from sliding said moving assembly when said sail is pivoted by the force of said gas stream such that said filter cleaning motion and shock cannot then be applied.

7. A vacuum collector according to claim 6 wherein said actuating means comprises a strong actuating lever pivotally pinned to a fulcrum bracket attached to the housing structure, with a handle at the end of the lever and external to said housing for manual operation, and carrying a roller capable of applying force only in said longitudinal direction of said shafts to the center of a spider of at least three arms in order to distribute said force to said shafts by means of connections at the ends of said arms.

8. A vacuum collector according to claim 6 wherein said actuating means comprises at least three solenoid actuators located near the periphery of said filter assembly and capable of being energized electrically to move the solenoid armatures which are connected to said moving assembly.

9. A vacuum collector according to claim 7 wherein said locking means comprises:

a catch on said hinged sail, and a locking shoulder on said spider located so as to be engaged by the catch when said sail is pivoted by the force of said gas stream such that said filter cleaning motion and shock cannot then be applied.

10. A vacuum collector according to claim 9 wherein said filter shock means further comprises springs mounted so as to keep the impact faces of each stop collar and mating stop plate adequately separated against the force of local gravity.

11. A vacuum collector according to claim 8 wherein said locking means comprises:

a microswitch which is electrically closed only if the sail is resting and exerting no force against it in the suction off position, and is electrically open only when said sail is pivoted by the force of said gas stream to prevent said solenoid actuators from being electrically energized.

12. A vacuum collector according to claim 11 wherein some of said strong metallic surfaces are carried integrally on a filter retaining ring firmly attached to said shafts.

13. A vacuum collector according to claim 12 wherein cleaning impacts are produced at each end of the longitudinal cleaning stroke in a bi-directional manner in said third dimension by alternately using said solenoid actuators to lift said moving assembly against the force of local gravity until said retaining ring metallic surfaces impact on their mating stop plates, and allowing local gravity force to drop said moving assembly until said shaft-attached stop collars impact on their mating stop plates.

14. A vacuum collector according to claim 10 or 13 wherein the mating impact faces for peripherally generating said sharp impact shocks in said third dimension are symmetrically located with respect to the periphery of said filter assembly.

15. A vacuum collector according to claim 14 wherein said filter assembly means comprises:
- a cylindrical pleated-paper-like filter, and
- an upper retaining ring capable of attachment to said flexible seal and with a large opening for the insertion of said blower into the interior of said cylindrical pleated-paper-like filter, and
- a lower filter retaining ring capable of being closed to said dust enclosure.

16. A vacuum collector according to claim 15 wherein the masses and springable flexibilities of the components of the filter assembly, and particularly the retaining rings and shafts, have been empirically adjusted in a cut-and-try process to maximize the in-planar vibration of the pleated paper filter and to maintain it uniformly over the filter surfaces, while not allowing transverse vibration.

* * * * *